United States Patent
Wu

(10) Patent No.: US 11,477,067 B2
(45) Date of Patent: Oct. 18, 2022

(54) PACKET TRANSMISSION METHOD AND APPARATUS

(71) Applicant: HUAWEI TECHNOLOGIES CO., LTD., Guangdong (CN)

(72) Inventor: Zhan Wu, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 99 days.

(21) Appl. No.: 17/030,168

(22) Filed: Sep. 23, 2020

(65) Prior Publication Data

US 2021/0006452 A1    Jan. 7, 2021

Related U.S. Application Data

(63) Continuation of application No. PCT/CN2019/079536, filed on Mar. 25, 2019.

(30) Foreign Application Priority Data

Mar. 26, 2018    (CN) .......................... 201810253225.6

(51) Int. Cl.
*H04L 41/042*   (2022.01)
*G06F 16/27*    (2019.01)
(Continued)

(52) U.S. Cl.
CPC .............. *H04L 41/042* (2013.01); *G06F 9/52* (2013.01); *G06F 16/27* (2019.01); *H04L 67/1095* (2013.01)

(58) Field of Classification Search
CPC ... H04L 41/042; H04L 67/1095; G06F 16/27; G06F 9/52

(Continued)

(56) References Cited

U.S. PATENT DOCUMENTS 7,885,981 B2 * 2/2011 Kaufman ............ G06F 16/2423
                                                    707/802
7,941,521 B1 * 5/2011 Petrov ...................... H04L 67/10
                                                    709/224

(Continued)

FOREIGN PATENT DOCUMENTS

CN        1852191 A     10/2006
CN      102594852 A      7/2012

(Continued)

OTHER PUBLICATIONS

R. Enns, Ed. et al:"Network Configuration Protocol (NETCONF)",Request for Comments: 6241 ,Jun. 2011,total 113 pages.

(Continued)

*Primary Examiner* — Thu Ha T Nguyen
(74) *Attorney, Agent, or Firm* — Womble Bond Dickinson (US) LLP

(57) ABSTRACT

This application provides a data processing method and a related device, to keep data consistency between a management device and a forwarder in a multi-head management scenario. The method performed by a first management device in the plurality of management devices includes: sending a lock instruction to the forwarder; performing difference comparison between target data of the first management device and corresponding data that is on the forwarder and that corresponds to the target data to obtain a comparison result; and synchronizing the target data with the corresponding data if the first management device determines, by using the comparison result, that the target data and the corresponding data do not match, so that the target data matches the corresponding data.

17 Claims, 8 Drawing Sheets

(51) Int. Cl.
*G06F 9/52* (2006.01)
*H04L 67/1095* (2022.01)

(58) Field of Classification Search
USPC .................................................. 709/223, 224
See application file for complete search history.

(56) References Cited

U.S. PATENT DOCUMENTS

| | | | | |
|---|---|---|---|---|
| 8,386,593 | B1* | 2/2013 | Gao | H04L 41/085 |
| | | | | 709/224 |
| 9,401,772 | B2* | 7/2016 | Chiba | H04L 41/0873 |
| 9,495,652 | B1* | 11/2016 | Cook | G06Q 30/0201 |
| 10,021,765 | B1* | 7/2018 | Elliot | H05B 47/115 |
| 10,057,243 | B1* | 8/2018 | Kumar | H04L 9/0891 |
| 10,200,258 | B2* | 2/2019 | Mattson | H04L 41/5051 |
| 2007/0100978 | A1* | 5/2007 | Levi | H04L 51/38 |
| | | | | 709/223 |
| 2009/0132070 | A1* | 5/2009 | Ebrom | H05B 6/688 |
| | | | | 700/90 |
| 2010/0134257 | A1* | 6/2010 | Puleston | G06K 7/0008 |
| | | | | 340/10.4 |
| 2011/0191303 | A1* | 8/2011 | Kaufman | G06F 7/00 |
| | | | | 707/684 |
| 2011/0238817 | A1* | 9/2011 | Okita | H04L 43/0817 |
| | | | | 709/224 |
| 2012/0224057 | A1* | 9/2012 | Gill | G06F 21/55 |
| | | | | 348/143 |
| 2013/0301658 | A1* | 11/2013 | Chiba | H04J 3/0658 |
| | | | | 370/503 |
| 2013/0332927 | A1* | 12/2013 | Tang | G06F 9/45545 |
| | | | | 718/1 |
| 2014/0248852 | A1* | 9/2014 | Raleigh | H04W 12/068 |
| | | | | 455/566 |
| 2016/0020989 | A1 | 1/2016 | Sella et al. | |
| 2016/0050125 | A1* | 2/2016 | Mattson | H04L 41/5051 |
| | | | | 709/225 |
| 2016/0218884 | A1* | 7/2016 | Ebrom | H04L 12/2816 |
| 2017/0222864 | A1 | 8/2017 | Wang et al. | |
| 2017/0279971 | A1* | 9/2017 | Raleigh | H04W 60/06 |
| 2019/0324436 | A1* | 10/2019 | Cella | H04L 47/122 |
| 2020/0201790 | A1* | 6/2020 | Kovacevic | G06F 9/526 |
| 2020/0401441 | A1* | 12/2020 | Evans | G06F 12/1491 |
| 2021/0234715 | A1* | 7/2021 | Liu | H04L 41/0816 |
| 2022/0060561 | A1* | 2/2022 | Shribman | H04L 63/029 |

FOREIGN PATENT DOCUMENTS

| | | |
|---|---|---|
| CN | 104378299 A | 2/2015 |
| CN | 104731943 A | 6/2015 |
| CN | 105933327 A | 9/2016 |
| CN | 106332067 A | 1/2017 |
| CN | 106341353 A | 1/2017 |
| EP | 2985951 A1 | 2/2016 |
| WO | 2012101690 A1 | 8/2012 |

OTHER PUBLICATIONS

Shui gong he diao:"Learn the sixth of open daylight from scratch",Aug. 4, 2017,total 8 pages.
Ming Yi:"Dry goods storage time NETCONF",Jun. 23, 2017,total 6 pages.
12 H3C. Network Management and Monitoring Configuration Guide,Jul. 1, 2017,total 45 pages.
10 . Network Management and Monitoring Configuration Guide,Jan. 1, 2015,total 36 pages.

* cited by examiner

PACKET TRANSMISSION METHOD AND APPARATUS

CROSS-REFERENCE TO RELATED APPLICATIONS

This application is a continuation of International Application No. PCT/CN2019/079536, filed on Mar. 25, 2019, which claims priority to Chinese Patent Application No. 201810253225.6, filed on Mar. 26, 2018. The disclosures of the aforementioned applications are hereby incorporated by reference in their entireties.

TECHNICAL FIELD

This application relates to the communications field, and in particular, to a data processing method and a related device.

BACKGROUND

A controller in software-defined networking (SDN) manages a forwarder in a plurality of scenarios. For example, one of the plurality of scenarios is single-head management, in other words, the forwarder is managed by the controller only, and another scenario is multi-head management, in other words, the forwarder may be controlled by a plurality of management devices, where the plurality of devices may include the controller or another management device.

When the forwarder is independently controlled by the management device, there may be a plurality of scenarios in which data inconsistency occurs during interaction between the forwarder and the management device. For example, the forwarder restarts but a configuration on the forwarder is not stored, or there is a network fault between the forwarder and the controller, or data inconsistency is caused by the forwarder, for example, a system of the forwarder is busy, or a database of the controller is restored, or there is a redundancy scenario. All of these may result in data inconsistency on the forwarder and the management device. In the foregoing single-head management scenario, data inconsistency between the management device and the forwarder can be rectified mainly by the management device or the forwarder. In the multi-head management scenario, a reason for data inconsistency between the forwarder and the management device may be: The forwarder is controlled by another management device in addition to the management device, and data delivered by the another management device conflicts with data delivered by the management device. However, the forwarder usually cannot determine whether to use the data on the management device or the data on the forwarder. Consequently, a processing manner for data synchronization is complex, and efficiency is low. Therefore, in the multi-head management scenario, how to ensure data consistency between the management device and the forwarder becomes an urgent problem to be resolved.

SUMMARY

This application provides a data processing method and a related device, applied to a multi-head management scenario, so that data consistency between a management device and a forwarder can be implemented more efficiently and flexibly, and reliability of communication between the management device and the forwarder is improved.

In view of this, a first aspect of this application provides a data processing method, applied to a multi-head management scenario, where the multi-head management scenario is a scenario in which a forwarder is managed by a plurality of management devices, and the method may include: sending, by a first management device in the plurality of management devices, a lock instruction to the forwarder, where the lock instruction is used to instruct the forwarder to switch to a locked state, and the locked state is a state in which the forwarder is controlled only by the first management device; performing, by the first management device, difference comparison between target data of the first management device and corresponding data that is on the forwarder and that corresponds to the target data to obtain a comparison result; and synchronizing, by the first management device, the target data with the corresponding data if the first management device determines, by using the comparison result, that the target data and the corresponding data do not match, so that the target data matches the corresponding data.

In one embodiment of this application, first, the first management device locks the forwarder, so that the forwarder is in the locked state in which the forwarder can be controlled only by the first management device, to avoid impact of another management device on data synchronization between the first management device and the forwarder. Then, the first management device synchronizes the target data with the corresponding data, so that it can be ensured that the target data on the first management device is consistent with the corresponding data that is on the forwarder and that corresponds to the target data.

With reference to the first aspect of this application, in a first embodiment of the first aspect of this application, the sending, by a first management device, a lock instruction to the forwarder may include:

sending, by the first management device, the lock instruction to the forwarder, where the lock instruction includes a lock indication and identity information of the first management device, the identity information is used by the forwarder to determine a lock source, and the lock indication is used to instruct the forwarder to switch to the locked state in which the forwarder can be controlled only by the first management device.

In one embodiment of this application, the first management device may send the lock instruction to the forwarder by using a preconfigured format, for example, a netconf protocol format, and the lock instruction may carry the identity information of the first management device and the lock indication, so that the forwarder may determine the lock source based on the identity information, and based on the identity information and the lock indication, the forwarder may switch to the locked state in which the forwarder can be controlled only by the first management device, so as to reduce interference during communication between the first management device and the forwarder, and ensure data consistency between the first management device and the forwarder.

With reference to the first aspect of this application or the first embodiment of the first aspect of this application, in a second embodiment of the first aspect of this application, the synchronizing, by the first management device, the target data with the corresponding data may include:

determining, by the first management device based on the comparison result, to update the corresponding data by using the target data as a reference, or update the target data by using the corresponding data as a reference.

In one embodiment of this application, the first management device may determine, based on the comparison result, to update the corresponding data by using the target data as a reference, or update the target data by using the corresponding data as a reference. The management device determines a synchronization manner based on the comparison result. This can improve efficiency and accuracy of data synchronization.

With reference to the first aspect of this application or the first embodiment of the first aspect of this application, in a third embodiment of the first aspect of this application, the synchronizing, by the first management device, the target data with the corresponding data may further include:

obtaining, by the first management device, input information in response to a user operation; and then determining, by the first management device, an update manner for the target data and the corresponding data based on the input information.

In one embodiment of this application, a user may manually select an update manner for the target data and the corresponding data, and then the first management device updates the target data and the corresponding data based on selection of the user. The update manner of the target data and the corresponding data may be adjusted based on an actual situation, so that a synchronization manner of the target data and the corresponding data is closer to an actual requirement, and the target data can be more flexibly synchronized with the corresponding data.

With reference to the third embodiment of the first aspect of this application, in a fourth embodiment of the first aspect of this application, the first management device may further include a display interface, and before the obtaining, by the first management device, input information, the method may further include:

displaying, by the first management device, the comparison result in the display interface.

It should be noted that, in addition to that the first management device may include the display interface, the comparison result may be displayed on another display device. This is not limited herein.

In one embodiment of this application, the comparison result is displayed in the display interface. Then, the user determines the synchronization manner for the target data and the corresponding data based on the comparison result. Next, the user inputs the synchronization manner to the first management device. After that, the first management device updates the target data and the corresponding data. Therefore, the user can more intuitively observe the comparison result, and the target data and the corresponding data are updated more accurately, which is closer to the actual requirement.

With reference to any one of the first aspect of this application or the first embodiment of the first aspect of this application to the fourth embodiment of the first aspect of this application, in a fifth embodiment of the first aspect of this application, the performing, by the first management device, difference comparison between target data and corresponding data to obtain a comparison result may include:

obtaining, by the first management device, each feature of the target data and each corresponding feature of the corresponding data; and comparing, by the first management device, each feature of the target data with each corresponding feature of the corresponding data to obtain the comparison result.

In one embodiment of this application, a granularity for collecting the target data and the corresponding data is a feature, and each feature of the target data and each feature of the corresponding data are compared, so that an obtained comparison result is more accurate, and subsequent updating of the target data and the corresponding data is more accurate.

With reference to the fifth embodiment of the first aspect of this application, in a sixth embodiment of the first aspect of this application, the synchronizing, by the first management device, the target data with the corresponding data may further include:

if the comparison result is that a sub-feature under a target feature of the target data is greater than a sub-feature under a corresponding feature of the corresponding data, determining, by the first management device, to update the corresponding feature of the corresponding data by using the target feature of the target data as a reference; or if the comparison result is that a sub-feature under a target feature of the target data is less than a sub-feature under a corresponding feature of the corresponding data, determining, by the first management device, to update the target feature of the target data by using the corresponding feature of the corresponding data as a reference.

In one embodiment of this application, a controller may determine a synchronization manner for the target data and the corresponding data based on the comparison result, so that efficiency of synchronizing the target data and the corresponding data can be improved. In addition, during data synchronization, only a difference part may be synchronized, thereby further improving efficiency of synchronizing.

With reference to the fifth embodiment of the first aspect of this application, in a seventh embodiment of the first aspect of this application, the synchronizing, by the first management device, the target data with the corresponding data may further include:

displaying the comparison result in the display interface of the first management device or a display interface of the another display device; selecting, by the user, a synchronization manner for the target data and the corresponding data based on the displayed comparison result; then entering the selected synchronization manner into the first management device; and synchronizing, by the first management device, the target data with the corresponding data after the first management device receives the input information.

In one embodiment of this application, the user may determine the synchronization manner for the target data and the corresponding data based on the comparison result displayed in the display interface, so that the synchronization manner is closer to the actual requirement, and the target data can be more flexibly synchronized with the corresponding data.

With reference to any one of the first aspect of this application or the first embodiment of the first aspect of this application to the seventh embodiment of the first aspect of this application, in an eighth embodiment of the first aspect of this application, the method may further include:

sending, by the first management device, an unlock instruction to the forwarder, where the unlock instruction is used at least by the forwarder to release the locked state, so that the forwarder can be managed by another management device other than the first management device.

In one embodiment of this application, if the first management device no longer needs to control the forwarder, the first management device may send the unlock instruction to the forwarder, so that the forwarder releases the locked state in which the forwarder can be controlled only by the first management device. In this case, the another management device may send a lock instruction to the forwarder and control the forwarder, so that the forwarder can be more flexibly controlled by the plurality of management devices. In addition, each of the plurality of management devices may control the forwarder by using a lock instruction. When each management device controls the forwarder, the management device is not interfered with by other management devices, so that data consistency between the management device and the forwarder can be further ensured.

With reference to any one of the first aspect of this application or the first embodiment of the first aspect of this application to the eighth embodiment of the first aspect of this application, in a ninth embodiment of the first aspect of this application, after the synchronizing, by the first management device, the target data with the corresponding data, the method may further include:

updating, by the first management device, the corresponding data on the forwarder by using the target data if the first management device determines that the target data is inconsistent with the corresponding data on the forwarder.

After the first management device performs data synchronization on the forwarder, the first management device may normally communicate with the forwarder. If the first management device finds that data of the first management device is inconsistent with data of the forwarder afterwards, the first management device may update the data of the forwarder based on the data of the first management device, so that the data on the first management device is consistent with the corresponding data on the forwarder.

With reference to any one of the fifth embodiment of the first aspect of this application to the ninth embodiment of the first aspect of this application, in a tenth embodiment of the first aspect of this application, the obtaining, by the first management device, each feature of the target data and each corresponding feature of the corresponding data may include:

obtaining, by the first management device, each feature of the target data and each corresponding feature of the corresponding data based on a Yang data model or a tree structure.

In one embodiment of this application, the first management device may collect the target data and the corresponding data based on the Yang data model or the tree structure model. Subsequently, the first management device may perform difference comparison between the target data and the corresponding data by using the Yang data model and the tree structure model, so that a result of difference comparison is more accurate.

A second aspect of this application provides a data processing method, applied to a multi-head management scenario, where the multi-head management scenario is a scenario in which a forwarder is managed by a plurality of management devices, the plurality of management devices may include at least one first management device, and the method may include:

receiving, by the forwarder, a first lock instruction sent by the first management device in the plurality of management devices; and switching, by the forwarder, to a first locked state based on the first lock instruction, where the first locked state is a state in which the forwarder can be controlled only by the first management device.

In one embodiment of this application, after receiving the first lock instruction sent by the first management device, the forwarder may switch, based on the first lock instruction, to the first locked state in which the forwarder can be controlled only by the first management device. When the forwarder is in the first locked state, the forwarder can be controlled only by the first management device. Therefore, impact caused by another management device on communication between the first management device and the forwarder can be avoided.

With reference to the second aspect of this application, in a first embodiment of the second aspect of this application, after the switching, by the forwarder, to a first locked state based on the first lock instruction, the method may further include:

receiving, by the forwarder, update information sent by the first management device, where the update information may be generated when the first management device performs data synchronization; and updating, by the forwarder, corresponding data on the forwarder based on the update information, where the corresponding data is data that is on the forwarder and that corresponds to target data, and the target data is data on the first management device.

In one embodiment of this application, when the forwarder is in the first locked state in which the forwarder can be controlled only by the first management device, the first management device may synchronize the target data on the first management device with the corresponding data that is on the forwarder and that corresponds to the target data. Therefore, when the forwarder updates the corresponding data, because the forwarder is in the first locked state, interference from another management device can be avoided when the first management device controls the forwarder, thereby improving efficiency and reliability of communication between the first management device and the forwarder.

With reference to the second aspect of this application, in a second embodiment of the second aspect of this application, the receiving, by the forwarder, a first lock instruction sent by the first management device in the plurality of management devices may include:

receiving, by the forwarder, a lock instruction in a preconfigured format sent by the first management device, where the lock instruction may include the lock indication and identity information of the first management device. The lock instruction may be generated by the first management device according to a preconfigured protocol format. The protocol may be netconf. The lock instruction may include the lock indication and the identity information of the first management device. The forwarder may determine a lock source based on the identity information, and then switch, based on the identity information and the lock indication, to the first locked state in which the forwarder can be controlled only by the first management device. This avoids impact of another management device on communication between the first management device and the forwarder.

With reference to the second embodiment of the second aspect of this application, in a third embodiment of the second aspect of this application, the switching, by the forwarder, to a first locked state based on the first lock instruction may include:

identifying, by the forwarder, the lock source based on the identity information; and switching, by the forwarder, to the first locked state based on the lock source and the first lock instruction.

The forwarder may identify the lock source based on the identity information in the lock instruction. The identity information may be a user identifier of the first management device. After determining the lock source, the forwarder may be locked based on the first lock instruction, and switch to the first locked state in which the forwarder can be controlled only by the first management device, in other words, the first management device locks the forwarder.

Therefore, interference from another management device when the first management device communicates with the forwarder can be avoided.

With reference to the third embodiment of the second aspect of this application, in a fourth embodiment of the second aspect of this application, after the switching, by the forwarder, to the first locked state based on the lock source and the first lock instruction, the method may further include:

receiving, by the forwarder, configuration data; and determining, by the forwarder, whether identification information of a device that sends the configuration data matches the identity information of the first management device; and storing, by the forwarder, the configuration data if the identification information of the device that sends the configuration data matches the identity information of the first management device; or if the identification information of the device that sends the configuration data and the identity information of the first management device do not match, discarding, by the forwarder, the configuration data, or responding to the management device that sends the configuration data with failure information.

In one embodiment of this application, after the forwarder switches to the first locked state, if the forwarder receives the configuration data, the forwarder may identify the device that sends the configuration data. If the device that sends the configuration data is the lock source, the forwarder may store the configuration data or perform another corresponding operation on the configuration data; or if the device that sends the configuration data is not the lock source, the forwarder may ignore or respond with the failure information or the like. Therefore, another device may be prevented from modifying data on the forwarder when the forwarder is in the locked state.

With reference to any one of the second aspect of this application or the first embodiment of the second aspect of this application to the fourth embodiment of the second aspect of this application, in a fifth embodiment of the second aspect of this application, the method may further include:

receiving, by the forwarder, an unlock instruction sent by the first management device, and releasing, by the forwarder, the first locked state based on the unlock instruction.

When the first management device no longer needs to control the forwarder, the first management device may send the unlock instruction to the forwarder. When receiving the unlock instruction, the forwarder may release the first locked state based on the unlock instruction. The unlock instruction may also be sent by the first management device by using an unlock indication. In addition to the unlock indication, the unlock instruction may also include the identity information of the first management device. The forwarder may determine an unlock source based on the identity information.

With reference to any one of the second aspect of this application or the first embodiment of the second aspect of this application to the fourth embodiment of the second aspect of this application, in a sixth embodiment of the second aspect of this application, the method may further include:

releasing, by the forwarder, the first locked state when the forwarder determines that the first management device fails to respond within a preconfigured time or that data required by the forwarder is not within a management range of the first management device.

In one embodiment of this application, when the first management device fails to respond within the preconfigured time, for example, the first management device breaks down, is powered off, or is busy, or the data required by the forwarder is not within the management range of the first management device, the forwarder may forcibly release the first locked state, so that the forwarder normally communicates with another management device, and the forwarder may be further prevented from being in an idle state for a long time, thereby avoiding network resource waste.

With reference to the sixth embodiment of the second aspect of this application, in a seventh embodiment of the second aspect of this application, after the releasing, by the forwarder, the first locked state, the method may further include:

receiving, by the forwarder, a second lock instruction sent by a second management device other than the first management device in the plurality of management devices; and switching, by the forwarder based on the second lock instruction, to a second locked state in which the forwarder can be controlled only by the second management device. When the forwarder is in the second locked state, the second management device may also synchronize data on the second management device with the data on the forwarder.

In one embodiment of this application, after the forwarder releases the first locked state, the forwarder may receive the second lock instruction sent by the second management device, and then the forwarder may switch to the second locked state based on the second lock instruction. When the forwarder is in the second locked state, the forwarder can be controlled only by the second management device, so that impact of another management device on communication between the second management device and the forwarder can be avoided.

With reference to any one of the second aspect of this application or the first embodiment of the second aspect of this application to the seventh embodiment of the second aspect of this application, in an eighth embodiment of the second aspect of this application, the method may further include:

if the forwarder is in the first locked state, when the forwarder receives a third lock instruction sent by a third management device, discarding, by the forwarder, the third lock instruction, or responding to the management device that sends the third lock instruction with failure information.

If the forwarder is currently in a locked state, when the forwarder receives a lock instruction sent by another management device, the forwarder may ignore or discard the lock instruction, or respond with failure information, or the like, to ensure that the forwarder can be controlled only by a management device that currently locks the forwarder.

A third aspect of the embodiments of this application provides a management device, and the management device has a function of implementing the data processing method in the first aspect. The function may be implemented by hardware, or may be implemented by hardware by executing corresponding software. The hardware or the software includes one or more modules corresponding to the foregoing function.

A fourth aspect of the embodiments of this application provides a forwarder, and the forwarder has a function of implementing the data processing method in the first aspect. The function may be implemented by hardware, or may be implemented by hardware by executing corresponding software. The hardware or the software includes one or more modules corresponding to the foregoing function.

A fifth aspect of the embodiments of this application provides a management device, and the management device may include:

a processor, a memory, a bus, and an input/output interface, where the processor, the memory, and the input/output interface are connected by using the bus; the memory is configured to store program code; and when invoking the program code in the memory, the processor performs the operations performed by the first management device provided in any one of the first aspect or the embodiments of the first aspect of this application.

A sixth aspect of the embodiments of this application provides a forwarder, and the forwarder may include:

a processor, a memory, a bus, and an input/output interface, where the processor, the memory, and the input/output interface are connected by using the bus; the memory is configured to store program code; and when invoking the program code in the memory, the processor performs the operations performed by the forwarder provided in any one of the second aspect or the embodiments of the second aspect of this application.

A seventh aspect of the embodiments of this application provides a communications system, where the communications system includes at least two management devices and a forwarder; the at least two management devices are at least two management devices that perform any one of the embodiments of the first aspect to the second aspect of this application; and the forwarder is a forwarder that performs any one of the embodiments of the first aspect to the second aspect of this application.

An eighth aspect of the embodiments of this application provides a storage medium. It should be noted that the technical solutions of this application essentially, or the part contributing to the prior art, or all or some of the technical solutions may be implemented in a form of a software product. The computer software product is stored in a storage medium, and is configured to store a computer software instruction used by the foregoing device. The computer software instruction includes a program designed for the management device or the forwarder to perform any one of the first aspect to the second aspect.

The storage medium includes: any medium that can store program code, such as a USB flash drive, a removable hard disk, a read-only memory (ROM), a random access memory (RAM), a magnetic disk, or an optical disc.

A ninth aspect of the embodiments of this application provides a computer program product including an instruction. When the computer program product runs on a computer, the computer is enabled to perform the method according to any one of the optional embodiments of the first aspect or the second aspect of this application.

In the embodiments of this application, when the forwarder is in the multi-head management scenario, the forwarder is controlled by the plurality of management devices. When the first management device sends the lock instruction to the forwarder, the forwarder switches, based on the lock instruction, to the locked state in which the forwarder can be controlled only by the first management device, so that interference from the another management device can be avoided when the first management device controls the forwarder. Then, the first management device performs difference comparison between the target data of the first management device and the corresponding data on the forwarder, and performs data synchronization between the target data and the corresponding data, so that the target data on the first management device is consistent with the corresponding data on the forwarder. Because the forwarder is in the locked state in which the forwarder can be controlled only by the first management device and cannot be controlled by the management device other than the first management device, this can avoid interference from the another management device when the first management device performs difference comparison and data synchronization, and more efficiently and flexibly ensure the data consistency between the first management device and the forwarder.

DESCRIPTION OF EMBODIMENTS

This application provides a data processing method and a related device, applied to a multi-head management scenario, so that data consistency between a management device and a forwarder can be implemented more efficiently and flexibly, and reliability of communication between the management device and the forwarder is improved.

Figure 1:
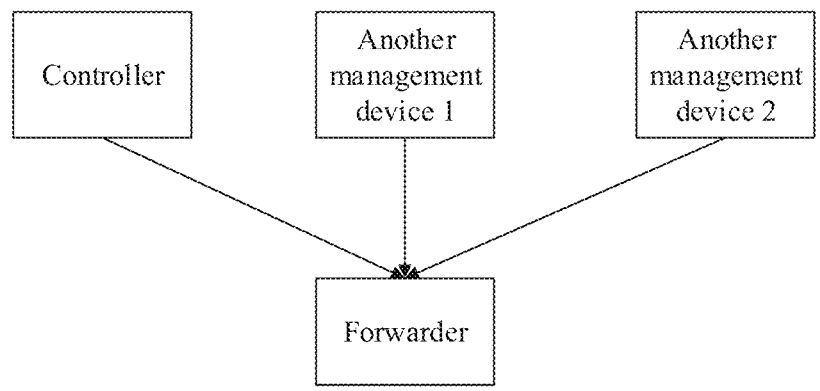
FIG. 1 is a schematic diagram of a network architecture according to an embodiment of this application.
Figure 2:
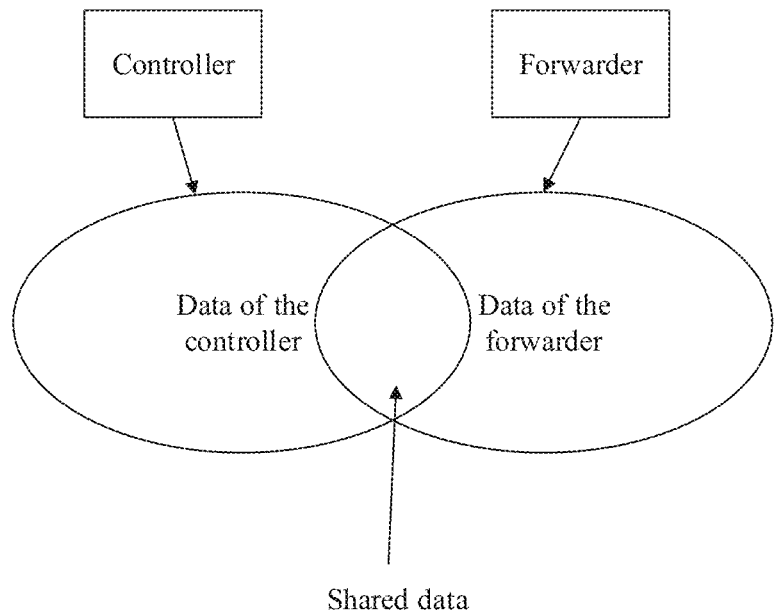
FIG. 2 is a schematic diagram of data according to an embodiment of this application.
Figure 3:
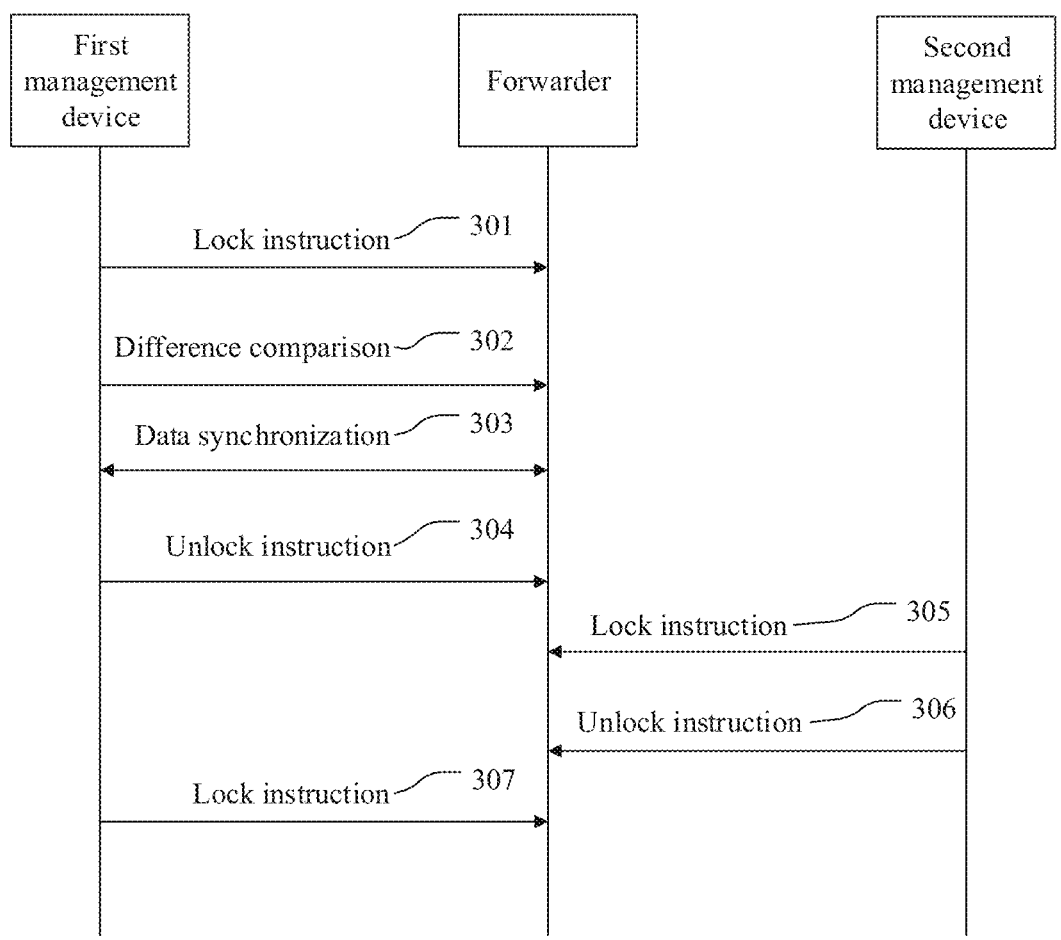
FIG. 3 is a schematic diagram of an embodiment of a data processing method according to an embodiment of this application.

An SDN network is a software-defined network architecture in which a control plane is separated from a data forwarding plane of a switch in a conventional network, and a forwarder in the network is managed all by a centralized management device. The SDN network may include a forwarder and one or more management devices used for managing the forwarder. A network architecture diagram in this application may be shown in FIG. 1. In a network architecture in an embodiment of this application, a forwarder may be managed by a plurality of management devices, in other words, in a multi-head management scenario. The plurality of management devices may include at least one controller or one or more other management devices. The controller may be an agile controller (AC). A specific management manner may be as follows: One controller is used as an example. The controller may deliver data to the forwarder, including configuration data, forwarding data, and the like. Then, the controller performs data communication with the forwarder by using a preconfigured protocol format, including that the controller controls the forwarder to forward data, and the like. In actual application, the forwarder may be controlled by a plurality of management devices. Therefore, data of the plurality of management devices may exist on the forwarder. When data on a controller is inconsistent with the data on the forwarder, the forwarder cannot determine whether to use the data on the controller or the data on the forwarder. Consequently, communication between the controller and the forwarder may fail, the forwarder cannot forward data, or the like. For example, as shown in FIG. 2, only a part of the data on the controller is the same as that on the forwarder. Because the forwarder may be controlled by another management device, and the another management device may modify the data on the forwarder, the data on the controller is inconsistent with the data on the forwarder, for example, configuration data on the forwarder. To ensure consistency between the data on the management device and the data on the forwarder, an embodiment of this application provides a data processing method. FIG. 3 is a schematic flowchart of a data processing method according to an embodiment of this application.

301. A first management device locks a forwarder.

That the first management device locks the forwarder may be as an example that the first management device sends a lock instruction to the forwarder. For example, when the first management device needs to control the forwarder, the first management device first sends the lock instruction to the forwarder to lock the forwarder, so that the forwarder is in a first locked state in which the forwarder can be controlled only by the first management device. In this case, the forwarder may not receive or ignore an instruction, data, or the like sent by another management device other than the first management device, or may reply with information indicating a communication failure or indicating that a system is busy, or the like, or may open only a query interface to provide data querying for the another management device, or the like. This is not limited herein. For a manner of the lock instruction, refer to descriptions of operation 401 in the following embodiment shown in FIG. 4. Another lock manner may be used, and this is not limited in this application. When the forwarder is in the first locked state, the forwarder can be controlled only by the first management device, and the forwarder cannot be controlled by the another management device. Therefore, when the first management device controls the forwarder, for example, when the first management device controls the forwarder to forward forwarding data sent from the first management device to user equipment, the another management device cannot control the forwarder. This avoids a data forwarding failure or the like caused because the another management device modifies configuration data of a communication channel on the forwarder. In a background of multi-head management, the forwarder cannot be managed by another management device after the forwarder is locked by a management device in a plurality of management devices, for example, the first management device in this embodiment, for example, an SDN controller, so that the first management device is not interfered with by the another management device when controlling the forwarder, thereby improving efficiency and reliability of communication between the first management device and the forwarder.

302. The first management device performs difference comparison.

After the first management device sends the lock instruction to the forwarder, to enable the forwarder to be in the first locked state, the first management device determines target data of the first management device, collects corresponding data that is on the forwarder and that corresponds to the target data, and performs difference comparison between the target data and the corresponding data to obtain a comparison result. The first management device may synchronize the target data with the corresponding data based on the comparison result in a preset synchronization manner. Alternatively, a user determines, based on the comparison result presented by the first management device to the user by using a user interface, a synchronization manner for synchronizing the target data with the corresponding data.

The first management device may collect the corresponding data on the forwarder by using a Yang model, a tree structure, or the like. For an implementation, refer to descriptions in the embodiment shown in FIG. 4 to FIG. 8.

303. The first management device performs data synchronization with the forwarder.

After the first management device performs difference comparison to obtain the comparison result, the first management device performs data synchronization with the forwarder. The foregoing preset synchronization manner may include: The first management device determines, based on the comparison result, to update the corresponding data by using the target data as a reference, to update the target data by using the corresponding data as a reference, or the like. Certainly, as described above, another implementation may also include: The user may determine the synchronization manner based on the comparison result. For example, the user determines to update the corresponding data by using the target data as a reference, update the target data by using the corresponding data as a reference, or the like.

Therefore, in this embodiment of this application, after the first management device locks the forwarder, the first management device performs data synchronization with the forwarder. In this case, the first management device may not be interfered with by the another management device, so that data consistency between the first management device and the forwarder is ensured, and efficiency and reliability of communication between the first management device and the forwarder are improved. After data synchronization is complete, the first management device may further deliver configuration data to the forwarder, so that the first management device normally communicates with the forwarder.

After data synchronization between the first management device and the forwarder is complete, the first management device may normally communicate with the forwarder, including that the first management device controls the forwarder to forward data sent to the user equipment, or the forwarder forwards data sent by the user equipment, or the like.

In addition, after the first management device performs data synchronization with the forwarder, if the first management device determines that data on the first management device is inconsistent with data on the forwarder, the first management device may update the data on the forwarder based on the data on the first management device. For details, refer to descriptions of the following embodiment shown in FIG. 10.

304. The first management device unlocks the forwarder.

When the first management device does not need to control the forwarder, for example, when the first management device completes controlling the forwarder to send the forwarding data to the user equipment, the first management device may unlock the forwarder. A manner in which the first management device unlocks the forwarder may be as follows: The first management device sends an unlock instruction to the forwarder, and the forwarder may release the locked state after receiving the unlock instruction. For a manner of the unlock instruction, refer to descriptions of operation 405 in the following embodiment shown in FIG. 4. Another unlock manner may also be used, and this is not limited in this application. After the forwarder is unlocked, the forwarder may receive information or an instruction sent by any management device within a range of the forwarder, so that the another management device locks the forwarder as required to perform locking control, thereby ensuring normal communication of the another management device. In addition, switch between lock and unlock may enable the forwarder to flexibly communicate normally between the plurality of management devices. This improves reliability of communication between the forwarder and the another management device. It may be understood that when no other management device performs locking control on the forwarder, the forwarder is in a state of receiving control from the plurality of management devices. Whether each management device needs to lock the forwarder is determined based on a type of data exchange between each management device and the forwarder. An associated device does not need to lock the forwarder if the management device only needs to query the data on the forwarder. The management device needs to lock the forwarder if the management device needs to control the forwarder, or perform data synchronization between data on the management device and the data on the forwarder, or the like, for example, to control the forwarder to forward data or control the forwarder to modify data.

305. A second management device sends a lock instruction to the forwarder.

After the first management device sends the unlock instruction to the forwarder, the forwarder is in an unlocked state. In this case, the second management device may send the lock instruction to the forwarder, and the forwarder may switch, based on the lock instruction sent by the second management device, to a second locked state in which the forwarder can be controlled only by the second management device. In this case, the second management device may control the forwarder, and is not interfered with by another management device. In addition, the second management device may perform difference comparison between data on the second management device and the data on the forwarder, and perform data synchronization based on the difference comparison result, so that the data on the second management device is consistent with the data on the forwarder. Alternatively, when the second management device is a management device other than the controller, the second management device may not perform difference comparison, and the second management device directly communicates with the forwarder, or the like. This is not limited herein.

306. The second management device sends an unlock instruction to the forwarder.

When the second management device no longer needs to control the forwarder, the second management device also needs to send the unlock instruction to the forwarder, so that the forwarder releases the second locked state.

307. The first management device sends a lock instruction to the forwarder.

When the forwarder is in an unlocked state, if the first management device needs to continue to control the forwarder, the first management device needs to send the lock instruction to the forwarder again, and may continue to communicate with the forwarder only after locking the forwarder. For example, when the first management device needs to re-send transmission data to the user equipment by using the forwarder, the first management device needs to control the forwarder. In this case, the first management device may send the lock instruction to the forwarder, so that the forwarder switches to the locked state in which the forwarder can be controlled only by the first management device.

It should be understood that in this embodiment of this application, when the first management device controls the forwarder, the first management device locks the forwarder, and when the first management device does not need to control the forwarder, the first management device may release the locked state of the forwarder. In addition to the lock and unlock operations provided in this embodiment of this application, locking and unlocking may be performed in another manner. After the forwarder releases the locked state in which the forwarder can be controlled only by the first management device, the forwarder may be locking controlled again by the first management device, or may be locking controlled by the second management device. This is not limited herein. Therefore, operation 305 to operation 307 may be optional operations.

In this embodiment of this application, when the first management device needs to control the forwarder, the first management device first needs to send the lock instruction to the forwarder, if the forwarder is in the unlocked state, the forwarder may switch to the first locked state, and then the first management device may perform data synchronization with the forwarder, to ensure the data consistency between the first management device and the forwarder. When the first management device does not need to control the forwarder, the first management device may send the unlock instruction to the forwarder to release the first locked state of the forwarder. In this case, the forwarder may normally receive information from the another management device, and may be locked and controlled by the another management device. When the forwarder is locked, the forwarder can be controlled only by a management device performing locking. When the forwarder is not locked, the forwarder can be locked and then controlled by another device. Therefore, the forwarder can flexibly switch between the management devices, so that the forwarder can normally communicate and work in a multi-head management scenario.

Figure 4:
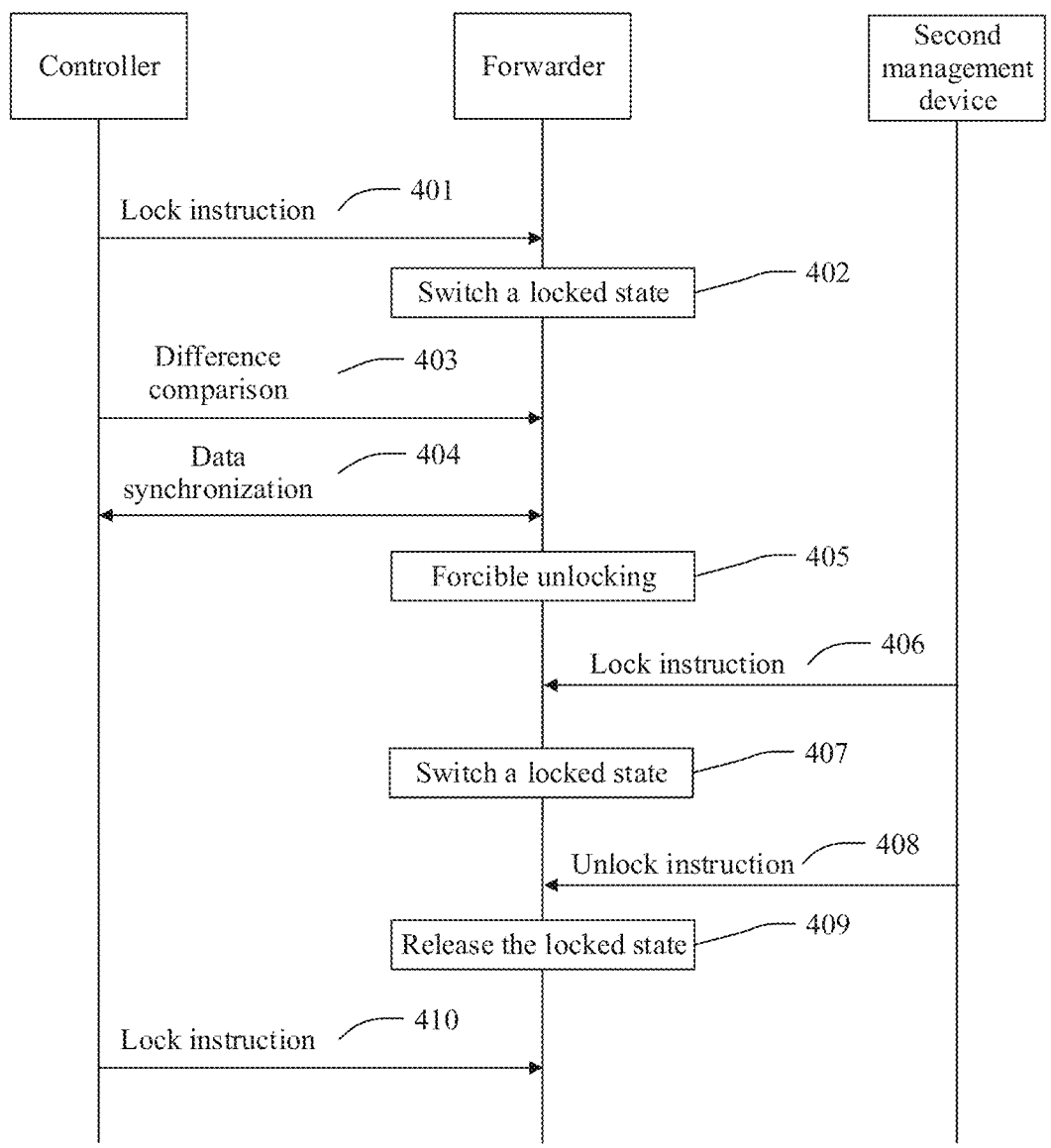
FIG. 4 is a schematic diagram of another embodiment of a data processing method according to an embodiment of this application.

The foregoing describes a procedure of the data processing method provided in this embodiment of this application. The following further describes the data processing method in this embodiment of this application. An example in which the first management device is a controller is used for description. FIG. 4 is a schematic diagram of another embodiment of a data processing method according to an embodiment of this application. The method includes the following operations.

401. A controller sends a lock instruction to a forwarder.

When the controller performs management control on the forwarder, the controller may first send the lock instruction to the forwarder by using a netconf protocol. In one embodiment, the lock instruction includes identity information of the controller, a lock indication, and the like. The identity information of the controller may be a user identifier, in other words, an identifier of the controller, and may be used by the forwarder to identify a lock source. The lock indication is used to instruct the forwarder to switch to a first locked state. When the forwarder is in the first locked state, a communication channel is established between the forwarder and the controller. The forwarder may receive only control information sent through the communication channel. In one embodiment, the forwarder may receive only the control information sent by the controller, and does not receive control information sent by another management device. Therefore, when the forwarder is in the first locked state, the forwarder can be controlled only by the controller. This can avoid a case in which when the controller controls the forwarder, data on the forwarder is modified by the another management device, for example, modified by another controller or a management server, causing a communication error between the controller and the forwarder, a data forwarding failure, or the like.

402. The forwarder switches a locked state.

When the forwarder receives the lock instruction sent by the controller, where the lock instruction includes the user identifier and the lock indication, the forwarder may identify the lock source based on the user identifier. If the forwarder is currently in an unlocked state, the forwarder may switch, based on the lock indication, to the first locked state in which the forwarder can be controlled only by the controller. When the forwarder is in the locked state in which the forwarder can be controlled only by the controller, the forwarder receives only control information sent by the controller. If control information of another management device such as another controller or a management server is received during this period, the forwarder may determine, by using the user identifier, that the another management device is not the lock source, and may discard the control information sent by the another management device or respond with an error. In addition, when the forwarder receives the lock instruction sent by the controller, if the forwarder is currently in a locked state, in other words, the forwarder is controlled by another management device other than the controller, the controller cannot currently lock the forwarder, and the controller can lock the forwarder only when the forwarder is in an unlocked state.

403. The controller performs difference comparison.

Figure 5:
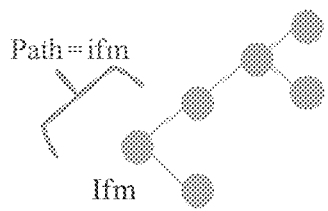
FIG. 5 is a schematic diagram of a feature of a data processing method according to an embodiment of this application.
Figure 6:
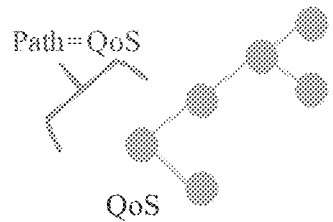
FIG. 6 is a schematic diagram of another data feature of a data processing method according to an embodiment of this application.
Figure 7:
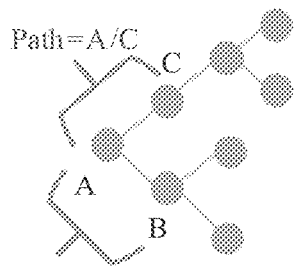
FIG. 7 is a schematic diagram of another data feature of a data processing method according to an embodiment of this application.

When the controller sends the lock instruction to the forwarder, and the forwarder switches to the first locked state, the forwarder can be controlled only by the controller. The controller performs difference comparison between target data on the controller and corresponding data on the forwarder to obtain a comparison result of difference comparison, where the comparison result is used by the controller to determine whether the target data matches the corresponding data. In one embodiment, operations of the controller performing difference comparison may include:

First, the controller determines the target data on the controller, and collects corresponding data that is on the forwarder and that corresponds to the target data. The forwarder may provide a data query interface, and the controller may query, by using the query interface, the corresponding data that is on the forwarder and that corresponds to the target data. For example, when the controller includes virtual private network (vpn) interface data for communicating with the forwarder, the forwarder also includes corresponding vpn interface data. In addition, the target data and the corresponding data may be other configuration data, communication data, or the like. In one embodiment, a granularity of the target data and the corresponding data may be a feature. For example, the feature may be an interface, a module, or the like. The interface may include a plurality of subinterfaces, the module may include a plurality of submodules, or the like. The target data and the corresponding data can be displayed in a Yang model or in a tree structure. For example, as shown in FIG. 5, when the corresponding data on the forwarder is collected, the target data and the corresponding data may be interface management (ifm) feature data, for example, a quantity of interfaces on the controller and the forwarder and an interface type. The controller uses an ifm feature as a path to collect ifm feature data on forwarder. A sub-feature of the ifm feature is subnode, which is used to collect a tree structure of the ifm feature. The target data and the corresponding data may be quality of service (Qos) feature data, for example, channel data and address data. As shown in FIG. 6, when the corresponding data may be stored in a database of the forwarder in a tree structure, the controller collects the corresponding data by using a QoS feature as a path. Each subnode is a sub-feature under the QoS feature. All subnodes under the QoS feature are collected to complete collection of a tree structure of the QoS feature. In addition, a collection start node may be a root node in the database of the forwarder, or may be a non-root node. For example, as shown in FIG. 7, a feature B and a feature C under a feature A are two features, and all subnodes under the feature A may be collected by using the feature B or the feature C as a root node, to collect complete corresponding data of the forwarder. Therefore, in actual application, the controller may collect the corresponding data according to the tree structure, so that the complete corresponding data can be collected, and both efficiency and accuracy are high.

Figure 8:
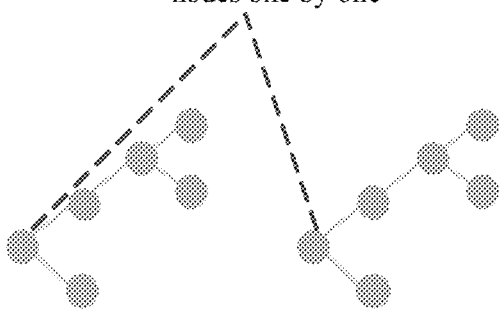
FIG. 8 is a schematic diagram of another data feature of a data processing method according to an embodiment of this application.
Figure 9:
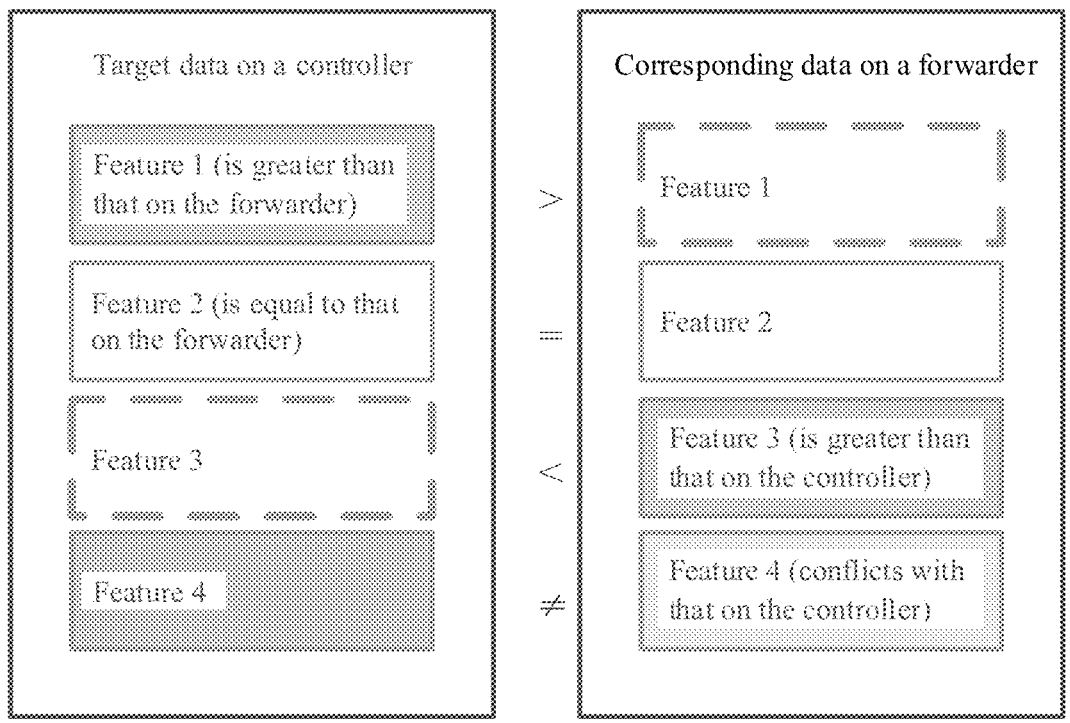
FIG. 9 is a schematic diagram of data comparison in a data processing method according to an embodiment of this application.

Then, the controller performs difference comparison between the target data of the controller and the corresponding data that is on the forwarder and that corresponds to the target data. If a structure model of the target data and the corresponding data is a tree structure, the controller may traverse and compare subnodes of the tree structure of the target data with subnodes of the tree structure of the corresponding data one by one. In this embodiment of this application, the controller may compare each node. This avoids data missing and a comparison result is more accurate. As shown in FIG. 8, the controller performs breadth traversal on the target data and the corresponding data, in other words, nodes in the tree structure of the data on the controller and nodes in the tree structure of the data on the forwarder one by one, to obtain a result of difference comparison, in other words, a difference between the target data and the corresponding data. For example, the result of difference comparison may be shown in FIG. 9. A sub-feature under a feature 1 of the target data is greater than a sub-feature under a feature 1 of the corresponding data, a sub-feature under a feature 2 of the target data is consistent with a sub-feature under a feature 2 of the corresponding data, a sub-feature under a feature 3 of the target data is less than a sub-feature under a feature 3 of the corresponding data, a sub-feature under a feature 4 of the target data conflicts with a sub-feature under a feature 4 of the corresponding data, and the like. Then, the controller determines a synchronization manner of the target data and the corresponding data. In addition, if the controller includes a display interface, the comparison result may be displayed in the display interface, and then a user selects a synchronization manner of the target data and the corresponding data.

404. The controller performs data synchronization with the forwarder.

After the controller performs difference comparison to obtain the comparison result of difference comparison, if the controller learns, by using the comparison result, that the target data and the corresponding data do not match, including that the target data on the controller is inconsistent with the corresponding data on the forwarder, or the target data on the controller does not correspond to data on the forwarder, or the like, the controller may synchronize the target data with the corresponding data, so that synchronized target data matches the corresponding data. After data synchronization is complete, the controller may further deliver configuration data to the forwarder, so that the controller normally communicates with the forwarder. A manner of performing data synchronization may be: if the data on the forwarder is updated based on the data on the controller, the controller may send update information to the forwarder, where the update information may be a part of the data on the controller that is different from the data on the forwarder, or may be the entire data on the controller. This is not limited herein. After receiving the update information, the forwarder may store the update information to the forwarder, or the forwarder may update the data on the forwarder in a preconfigured manner based on the update information. This is not limited herein. If the data on the controller is updated based on the data on the forwarder, the controller may directly obtain differential data from the data query interface provided by the forwarder, and then store the differential data to the controller, or the controller may obtain all data that is on the forwarder and that corresponds to the data on the controller, and then store all the data that corresponds to the data on the controller. This is not limited herein.

Figure 10:
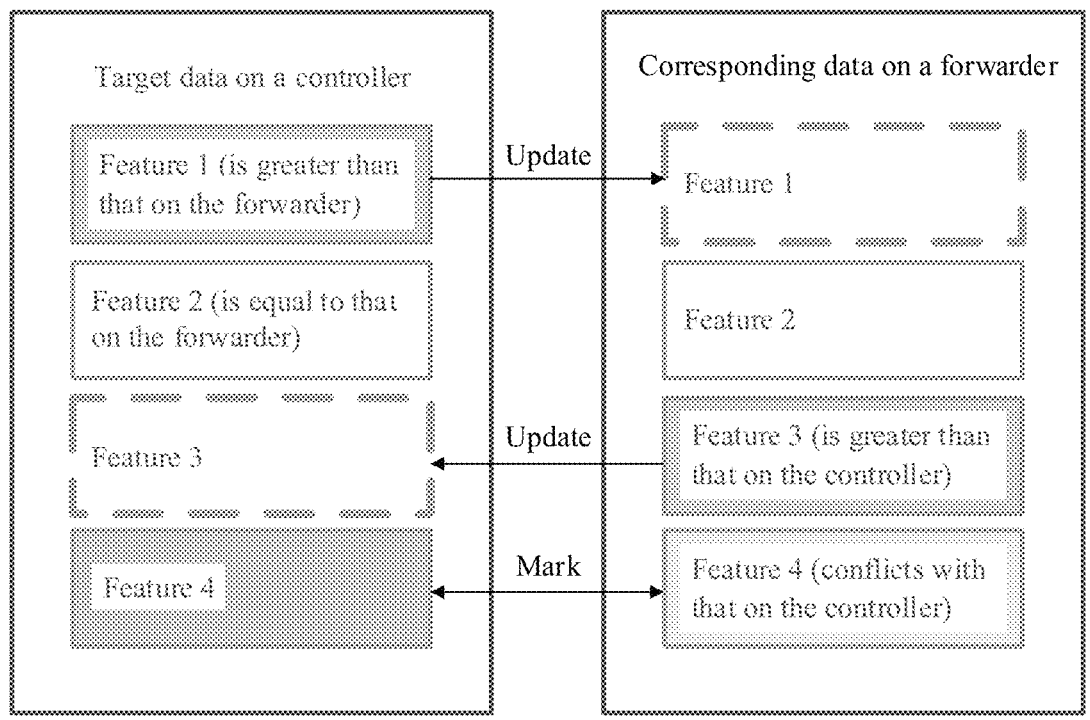
FIG. 10 is a schematic diagram of data synchronization in a data processing method according to an embodiment of this application.

In one embodiment, for the foregoing synchronization process, refer to FIG. 10. As shown in FIG. 10, if a feature 1 of the target data is greater than a feature 1 of the corresponding data, the controller may update the feature 1 of the corresponding data by using the feature 1 of the target data as a reference, so that an updated feature 1 of the corresponding data is consistent with the feature 1 of the target data. If a feature 2 of the target data is consistent with a feature 2 of the corresponding data, the controller may not update the feature 2 of the target data and the feature 2 of the corresponding data. If a feature 3 of the target data is less than a feature 3 of the corresponding data, the controller may update the feature 3 of the target data by using the feature 3 of the corresponding data as a reference, so that a update feature 3 of the target data is consistent with the feature 3 in the corresponding data. In addition, if a feature 4 of the target data conflicts with a feature 4 of the corresponding data, the feature 4 of the target data or the feature 4 of the corresponding data may be marked, and the feature 4 of the target data and the feature 4 of the corresponding data are not processed temporarily, or the feature 4 of the corresponding data is updated based on the feature 4 of the target data, or the feature 4 of the target data is updated based on the feature 4 of the corresponding data. The controller automatically determines a synchronization manner for the target data and the corresponding data based on preset synchronization manners. For example, synchronization manners for different features may be different, so that accuracy of synchronizing the target data and the corresponding data can be improved, and working efficiency of the controller can be improved. In one embodiment, the preset synchronization manners may include: for conflicting data, the controller may deliver a replacement packet, so that the corresponding data on the forwarder is consistent with target data on the controller; for extra data on the controller, the controller may deliver a creation packet, and the forwarder adds the extra data on the controller; and for extra data on the forwarder, the controller may deliver a deletion packet to delete the extra data on the forwarder, or the controller may directly deliver a replacement packet to update the corresponding data based on the target data, or the like.

In another implementation, the comparison result of difference comparison may also be displayed on the controller or another display device; a user selects a synchronization manner based on the comparison result; the controller may receive input information of the user; and then the controller or the forwarder synchronizes the target data with the corresponding data in the synchronization manner selected by the user. For example, an interface shown in FIG. 9 may be displayed on the controller or the another display device. The user may select to update the feature 1 of the target data by using the feature 1 of the corresponding data as a reference, or update the feature 3 of the corresponding data by using the feature 3 of the target data as a reference. The user selects and determines the synchronization manner of the target data and the corresponding data, so that an update manner of the target data and the corresponding data can be more flexibly determined. This is closer to an actual requirement.

In addition, after the controller performs difference comparison and data synchronization, if the corresponding data on the forwarder is inconsistent with the target data on the controller due to another reason, for example, the forwarder restarts, the configuration data is not stored, a network fault occurs between the forwarder and the controller, or the forwarder is busy, the corresponding data on the forwarder may be updated by using the target data on the controller as a reference. If the target data on the controller is inconsistent with the corresponding data on the forwarder due to the controller, the target data on the controller may be updated by using the corresponding data on the forwarder as a reference.

405. The forwarder performs forcible unlocking.

After the controller performs data synchronization with the forwarder, the controller may normally control the forwarder to perform communication. For example, the controller may control the forwarder to forward data to a terminal device connected to the forwarder. When the controller no longer needs to control the forwarder, the controller may send an unlock instruction to the forwarder, so that the forwarder releases the locked state. After releasing the locked state, the forwarder may be controlled by another management device. Alternatively, the forwarder may perform forcible unlocking. For example, when the controller is abnormal, for example, the controller does not send information or a response to the forwarder for a long time due to reasons including breakdown, power-off, or a busy system, the forwarder may perform forcible unlocking to release the first locked state of the forwarder. Then, the forwarder may communicate with a second management device, receive a lock instruction from the second management device, and the like. If the controller sends the unlock instruction to the forwarder for unlocking, unlock operations may be as follows. The controller sends the unlock instruction to the forwarder, where the unlock instruction may include identity information of the controller and an unlock indication, and the identity information may be a user identifier, in other words, an identifier of the controller. The forwarder may compare the user identifier with a user identifier of a lock source. If the user identifier is consistent with the identifier of the lock source, the forwarder may release the first locked state based on the unlock instruction. If the user identifier is inconsistent with the identifier of the lock source, the forwarder may not release the locked state. In this embodiment of this application, when the controller does not send information to the forwarder within a preconfigured time, or data required by the forwarder is not within a management range of the controller, the forwarder may directly release the locked state. Then, the forwarder may communicate with the second management device, to avoid reducing communication efficiency of the forwarder because the controller does not respond for a long time. After the forwarder directly releases the locked state, if the controller works normally, the controller may sense that the forwarder releases the locked state controlled by the controller. If the controller needs to send data to the forwarder, the controller needs to relock the forwarder, and data transmission can continue only after the controller relocks the forwarder. For example, if the controller does not respond to the forwarder for a long time, and in this case, the second management device waits to control the forwarder, the first locked state of the forwarder may be directly released, so that the second management device may send the lock instruction to the forwarder. This reduces waiting duration of the second management device, and improves communication efficiency between the second management device and the forwarder. In another case, the data required by the forwarder is not within the management range of the controller. If the data required by the forwarder is within a management range of the second management device, the first locked state of the forwarder may be released, and the second management device locks the forwarder. Then, the forwarder obtains, by using the second management device, the data required by the forwarder. This improves working efficiency of the forwarder.

After the controller sends the unlock instruction to the forwarder, and the forwarder releases the locked state, or after the forwarder performs forcible unlocking, if the controller needs to control the forwarder again, the controller needs to send a lock instruction to the forwarder again to enable the forwarder to be in a locked state again, perform difference comparison and data synchronization, and then the controller can control the forwarder.

406. The second management device sends the lock instruction to the forwarder.

When the forwarder releases the first locked state, the second management device other than the controller may also send the lock instruction to the forwarder. For an implementation, refer to operation 401 in the embodiment shown in FIG. 4, so that the forwarder is in a locked state controlled by the second management device. The second management device may be a terminal device including a command-line interface (CLI), or may be another network management device. In addition, the second management device may be a controller. In one embodiment, when the second management device is the terminal device including the CLI, a user or another network management device may input a control instruction in the CLI, and then the terminal device including the CLI executes the instruction. When the forwarder is in a state locked by the terminal device including the CLI, the forwarder can be controlled only by the terminal device including the CLI, including that the data on the forwarder can be modified only by the terminal device including the CLI, but the data on the forwarder cannot be modified by a management device other than the terminal device including the CLI. This avoids that when the forwarder communicates with the terminal device including the CLI, the data is modified by another management device other than the terminal device including the CLI, and further a case occurs in which the forwarder fails to communicate with the terminal device including the CLI, or data forwarding fails, or the like.

407. The forwarder switches a locked state.

After receiving the lock instruction sent by the second management device, the forwarder may identify, based on the lock instruction, that a lock source is the second management device, and then switch to a second locked state based on the lock indication in the lock instruction. When the forwarder is in the second locked state, the forwarder receives only control information of the second management device, for example, data synchronization information and configuration data.

It should be understood that when the second management device is a management device other than the controller, after the second management device sends the lock instruction to the forwarder to lock the forwarder, the second management device may perform data difference comparison and data synchronization, or may directly control the forwarder. This is not limited herein.

408. The second management device sends an unlock instruction to the forwarder.

When the second management device does not need to control the forwarder, the second management device may send the unlock instruction to the forwarder, to release the second locked state in which the forwarder can be controlled only by the second management device.

It should be understood that, in addition to that the second management device may send the unlock instruction to the forwarder to release the locked state of the forwarder, the forwarder may also perform forcible unlocking. Then, another management device delivers a lock instruction and a configuration to the forwarder by using another channel, and then the another management device controls the forwarder. For example, when the user finds that the controller is closed due to power-off, or the controller fails to respond for a long time, or the like, and the forwarder is still in the locked state in which the forwarder is controlled by the controller, the forwarder may perform forcible unlocking to release from control of the controller. Then, another management device locks the forwarder, and the another management device controls the forwarder.

409. The forwarder releases the locked state.

After receiving the unlock instruction sent by the second management device, the forwarder releases the second locked state, in other words, the forwarder may receive a lock instruction sent by another management device at this time.

410. A controller sends a lock instruction to the forwarder.

After the forwarder releases the second locked state, if the controller needs to control the forwarder, the controller needs to send the lock instruction to the forwarder again to enable the forwarder to switch to a locked state in which the forwarder is controlled only by the controller, and then perform data synchronization, data transmission, and the like.

In this embodiment of this application, when the controller performs management control on the forwarder, first, the controller sends the lock instruction to the forwarder to lock the forwarder, so that the forwarder is in the locked state in which the forwarder can be controlled only by the controller, thereby preventing the another management device from tampering with the data on the forwarder when the controller communicates with the forwarder, to avoid a problem that the target data on the controller is inconsistent with the corresponding data on the forwarder because the another management device modifies the corresponding data on the forwarder; next, the controller performs difference comparison between the target data and the corresponding data, and performs data synchronization between the target data and the corresponding data, so that the target data on the controller is consistent with the corresponding data on the forwarder; and then the controller can communicate with the forwarder, and the forwarder is controlled by the controller. When the controller no longer needs to control the forwarder, the controller may send the unlock instruction to the forwarder to release the locked state of the forwarder. In this case, the another management device may lock the forwarder, and control and communication with the forwarder. This may avoid data modification when the another device communicates with the forwarder.

An embodiment is used as an example. A current network includes a controller, a forwarder, and a network management device. Both the controller and the network management device can control the forwarder. When the controller needs to control the forwarder, to prevent the network management device from controlling the forwarder, the controller may first send a lock instruction to the forwarder, so that the forwarder is in a locked state in which the forwarder can be controlled only by the controller. In this case, the network management device cannot control the forwarder, and cannot modify configuration data on the forwarder. A management channel is established between the controller and the forwarder. After the forwarder is in the locked state, the controller may perform difference comparison between target data, for example, target configuration data of the controller, and corresponding data, for example, corresponding configuration data on the forwarder by using a feature of the data as a granularity. If the target configuration data is inconsistent with the corresponding configuration data, the controller may update the target configuration data and the corresponding configuration data, the controller may update the corresponding configuration data based on the target configuration data, or may update the target configuration data based on the corresponding configuration data on the forwarder, so that the target configuration data is consistent with the corresponding configuration data, thereby avoiding that the controller cannot control the forwarder because the target configuration data is inconsistent with the corresponding configuration data. When the controller controls the forwarder, if the controller is in a power-off state, and the forwarder does not receive communication data from the controller for a long time, the forwarder may automatically perform forcible unlocking, or the forwarder may respond to a user operation to perform forcible unlocking, or the like, in other words, the locked state of the forwarder from the controller may be released. After working normally again, the controller may obtain a status of the forwarder. Then, the network management device may send a lock instruction to the forwarder through another management channel to lock the forwarder, deliver configuration data of the network management device, and the like. If the controller is always in a normal working state, when the controller does not need to control the forwarder, the controller may send an unlock instruction to the forwarder to unlock the forwarder. Next, the network management device may send a lock instruction to the forwarder, so that the forwarder is in a locked state controlled by the network management device. Then, the network management device controls the forwarder, performs normal communication, and the like.

Figure 11:
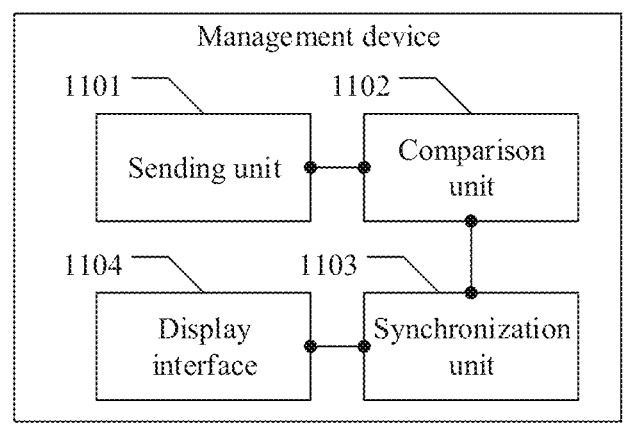
FIG. 11 is a schematic diagram of an embodiment of a management device according to an embodiment of this application.

The foregoing describes in detail the data processing method in the embodiments of this application. The following describes an apparatus provided in an embodiment of this application. FIG. 11 is a schematic diagram of an embodiment of a management device according to an embodiment of this application. The management device includes a sending unit 1101, a comparison unit 1102, and a synchronization unit 1103.

The sending unit 1101 is configured to send a lock instruction to a forwarder, where the lock instruction is used to instruct the forwarder to switch to a first locked state, and the first locked state is a state in which the forwarder is controlled only by the first management device. The sending unit 1101 is configured to implement implementation operations of the first management device in operation 301 in the embodiment corresponding to FIG. 3 and in operation 401 in the embodiment corresponding to FIG. 4.

The comparison unit 1102 is configured to perform difference comparison between target data and corresponding data to obtain a comparison result, where the target data is data on the first management device, and the corresponding data is data on the forwarder. The comparison unit 1102 is configured to implement implementation operations of the first management device in operation 302 in the embodiment corresponding to FIG. 3 and in operation 403 in the embodiment corresponding to FIG. 4.

The synchronization unit 1103 is configured to synchronize the target data with the corresponding data if it is determined, by using the comparison result, that the target data and the corresponding data do not match, so that the target data matches the corresponding data. The synchronization unit 1103 is configured to implement implementation operations of the first management device in operation 303 in the embodiment corresponding to FIG. 3 and in operation 404 in the embodiment corresponding to FIG. 4.

Optionally, in some possible implementations, the sending unit 1101 is configured to send a lock instruction in a preconfigured format to the forwarder, where the lock instruction includes a lock indication and identity information of the first management device, and the identity information is used by the forwarder to determine a lock source, to implement implementation operations of the first management device in operation 401 in the embodiment corresponding to FIG. 4.

Optionally, in some possible implementations,

The synchronization unit 1103 is configured to determine, based on the comparison result, to update the corresponding data by using the target data as a reference, or update the target data by using the corresponding data as a reference. The synchronization unit 1103 is configured to implement implementation operations of the first management device in operation 303 in the embodiment corresponding to FIG. 3 and in operation 404 in the embodiment corresponding to FIG. 4.

Optionally, in some possible implementations, the synchronization unit 1103 is further configured to:

obtain input information, where the input information is obtained by the management device in response to a user operation; and update the target data and the corresponding data based on the input information.

The synchronization unit 1103 is configured to implement implementation operations of the first management device in operation 303 in the embodiment corresponding to FIG. 3 and in operation 404 in the embodiment corresponding to FIG. 4.

Optionally, in some possible implementations, the management device further includes a display interface 1104.

The display interface 1104 is configured to display the comparison result of difference comparison. The display interface 1104 is configured to implement implementation operations of the first management device in operation 302 in the embodiment corresponding to FIG. 3 and in operation 403 in the embodiment corresponding to FIG. 4.

Optionally, in some possible implementations, the comparison unit 1102 is configured to:

obtain each feature of the target data and each corresponding feature of the corresponding data; and compare each feature of the target data with each corresponding feature of the corresponding data to obtain the comparison result. The comparison unit 1102 is configured to implement implementation operations of the first management device in operation 302 in the embodiment corresponding to FIG. 3 and in operation 403 in the embodiment corresponding to FIG. 4.

Optionally, in some possible implementations, the sending unit 1101 is further configured to send an unlock instruction to the forwarder, where the unlock instruction is used at least by the forwarder to release the locked state, so that the forwarder may be managed by another management device other than the first management device. The sending unit 1101 is configured to implement implementation operations of the first management device in operation 304 in the embodiment corresponding to FIG. 3.

Optionally, in some possible implementations, the synchronization unit 1103 is further configured to: after the synchronization unit synchronizes the target data with the corresponding data, update the corresponding data on the forwarder by using the target data if the target data is inconsistent with the corresponding data on the forwarder. The synchronization unit 1103 is configured to implement implementation operations of the first management device in operation 303 in the embodiment corresponding to FIG. 3 and in operation 404 in the embodiment corresponding to FIG. 4.

Optionally, in some possible implementations, the comparison unit 1102 is further configured to obtain each feature of the target data and each corresponding feature of the corresponding data based on a Yang data model or a tree structure. The comparison unit 1102 is configured to implement implementation operations of the first management device in operation 302 in the embodiment corresponding to FIG. 3 and in operation 403 in the embodiment corresponding to FIG. 4.

Figure 12:
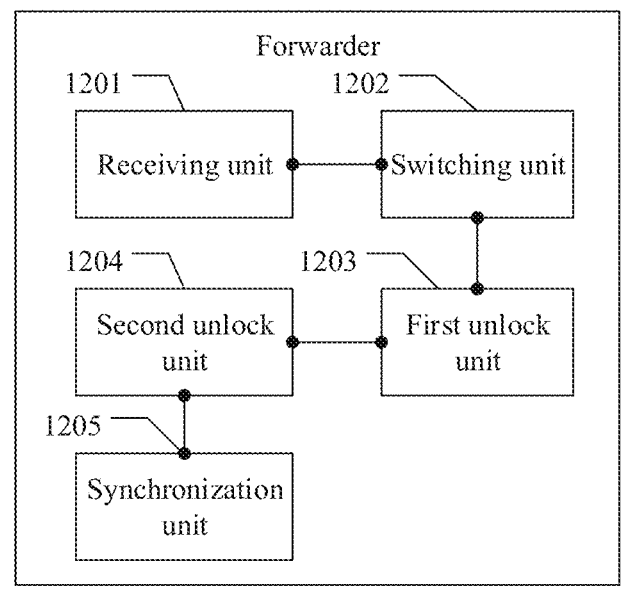
FIG. 12 is a schematic diagram of an embodiment of a forwarder according to an embodiment of this application.

In addition to the management device, this application further provides a forwarder. FIG. 12 is a schematic diagram of an embodiment of a forwarder according to an embodiment of this application. The forwarder includes a receiving unit 1201 and a switching unit 1202.

The receiving unit 1201 is configured to receive a first lock instruction sent by a first management device. The receiving unit 1201 is configured to implement implementation operations of the forwarder in operation 301 in the embodiment corresponding to FIG. 3 and in operation 401 in the embodiment corresponding to FIG. 4.

The switching unit 1202 is configured to switch to a first locked state based on the first lock instruction, where the first locked state is a state in which the forwarder can be controlled only by the first management device, so that the first management device synchronizes corresponding data and target data when the forwarder is in the first locked state, the target data is data on the first management device, and the corresponding data is data on the forwarder. The switching unit 1202 is configured to implement implementation operations of the forwarder in operation 301 in the embodiment corresponding to FIG. 3 and in operation 402 in the embodiment corresponding to FIG. 4.

Optionally, in some possible implementations, the forwarder further includes a synchronization unit 1205.

The receiving unit 1201 is further configured to receive update information sent by the first management device.

The synchronization unit 1205 is further configured to update the corresponding data on the forwarder based on the update information, where the corresponding data is data that is on the forwarder and that corresponds to the target data, and the target data is data on the first management device.

The synchronization unit 1205 is configured to implement implementation operations of the forwarder in operation 303 in the embodiment corresponding to FIG. 3 and in operation 404 in the embodiment corresponding to FIG. 4.

Optionally, in some possible implementations,

The receiving unit 1201 is configured to receive a lock instruction in a preconfigured format sent by the first management device, where the lock instruction includes a first lock instruction and identity information of the first management device. The receiving unit 1201 is configured to implement implementation operations of the forwarder in operation 302 in the embodiment corresponding to FIG. 3 and in operation 403 in the embodiment corresponding to FIG. 4.

Optionally, in some possible implementations, the switching unit 1202 is configured to:

identify a lock source based on the identity information; and switch to the first locked state based on the lock source and the first lock indication.

The switching unit 1202 is configured to implement implementation operations of the forwarder in operation 301 in the embodiment corresponding to FIG. 3 and in operation 402 in the embodiment corresponding to FIG. 4.

Optionally, in some possible implementations, after the forwarder switches to the first locked state based on the lock source and the first lock instruction, the synchronization unit 1205 is configured to:

receive configuration data; and store the configuration data if identification information of a device that sends the configuration data matches the identity information of the first management device; or if identification information of a device that sends the configuration data and the identity information of the first management device do not match, discard the configuration data, or respond to the management device that sends the configuration data with failure information.

The synchronization unit 1205 is configured to implement implementation operations of the forwarder in operation 303 in the embodiment corresponding to FIG. 3 and in operation 404 in the embodiment corresponding to FIG. 4.

Optionally, in some possible implementations, the forwarder further includes a first unlock unit 1203.

The receiving unit 1201 is further configured to receive an unlock instruction sent by the first management device. The receiving unit 1201 is configured to implement implementation operations of the forwarder in operation 304 in the embodiment corresponding to FIG. 3 and in operation 405 in the embodiment corresponding to FIG. 4.

The first unlock unit 1203 is configured to release the first locked state based on the unlock instruction.

Optionally, in some possible implementations, the forwarder further includes a second unlock unit 1204.

The second unlock unit 1204 is configured to release the first locked state when the forwarder determines that the first management device fails to respond within a preconfigured time or that data required by the forwarder is not within a management range of the first management device. The second unlock unit 1204 is configured to implement implementation operations of the forwarder performing forcible unlocking in operation 405 in the embodiment corresponding to FIG. 4.

Optionally, in some possible implementations, the receiving unit 1201 is further configured to receive a second lock instruction sent by a second management device, where the second management device is a management device other than the first management device in the plurality of management devices. The receiving unit 1201 is configured to implement implementation operations of the forwarder in operation 305 in the embodiment corresponding to FIG. 3 and in operation 406 in the embodiment corresponding to FIG. 4.

The switching unit 1202 is further configured to switch to a second locked state based on the second lock instruction, where the second locked state is a state in which the forwarder can be controlled only by the second management device. The switching unit 1202 is configured to implement implementation operations of the forwarder in operation 305 in the embodiment corresponding to FIG. 3 and operation 407 in the embodiment corresponding to FIG. 4.

Optionally, in some possible implementations, the receiving unit 1201 is further configured to: if the forwarder is in the first locked state, when the forwarder receives a third lock instruction sent by a third management device, discard the third lock instruction, or respond to the management device that sends the third lock instruction with failure information. The receiving unit 1201 is configured to implement implementation operations of the forwarder in operations 301, 305, and 307 in the embodiment corresponding to FIG. 3 and operations 402 and 407 in the embodiment corresponding to FIG. 4.

Figure 13:
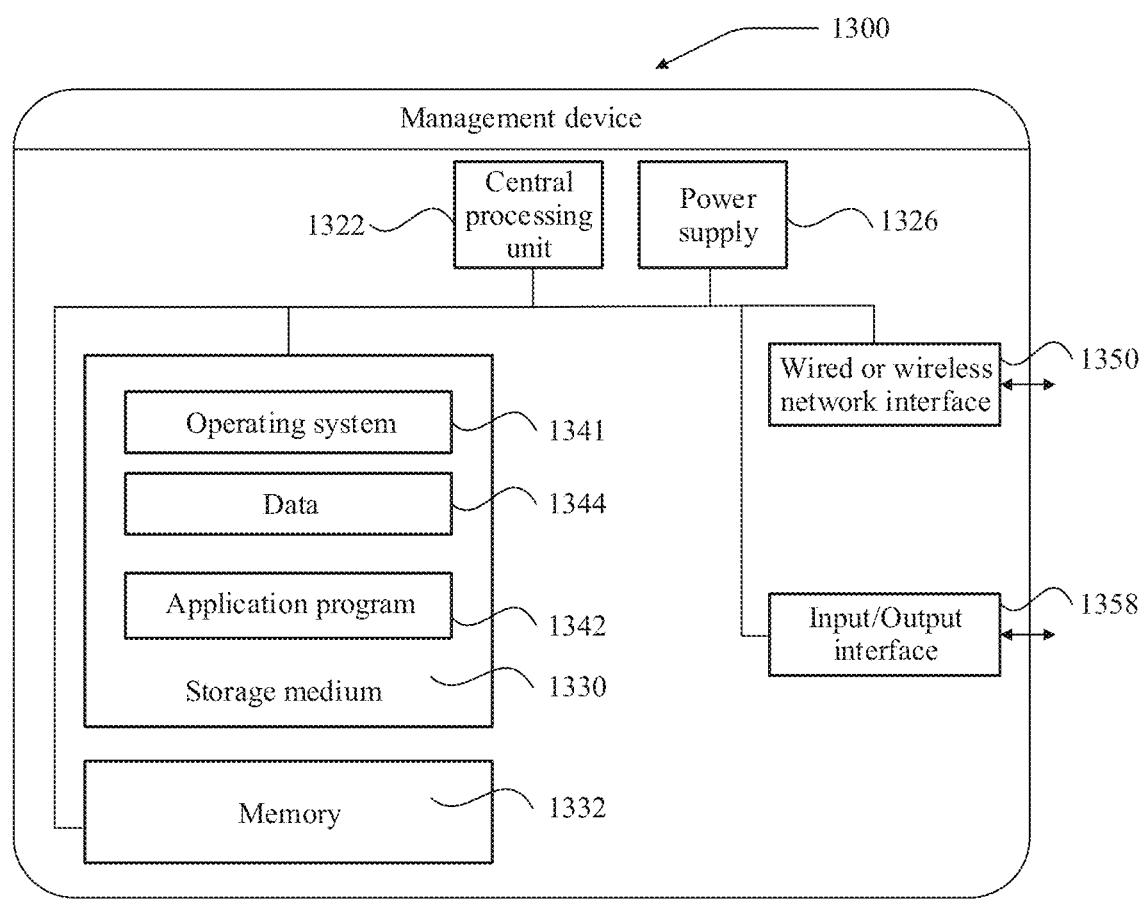
FIG. 13 is a schematic diagram of another embodiment of a management device according to an embodiment of this application.

FIG. 13 is a schematic diagram of another embodiment of a management device according to an embodiment of this application. The management device 1300 may vary greatly due to different configurations or performance, and may include one or more central processing units (CPU) 1322 (for example, one or more processors) and a memory 1332, one or more storage media 1330 (for example, one or more massive storage devices) that store an application program 1342 or data 1344. The memory 1332 and the storage medium 1330 may be used for temporary storage or permanent storage. The program stored in the storage medium 1330 may include one or more modules (not shown in the figure). Each module may include a series of instruction operations for the management device. Further, the central processing unit 1322 may be configured to communicate with the storage medium 1330, and perform, on the management device 1300, the series of instruction operations in the storage medium 1330.

The management device 1300 may further include one or more power supplies 1326, one or more wired or wireless network interfaces 1350, one or more input/output interfaces 1358, and/or one or more operating systems 1341, such as Windows Server™, Mac OS X™, Unix™, Linux™, and FreeBSD™.

Operations performed by the management device in FIG. 3 to FIG. 10 in the foregoing embodiments may be based on a structure of the management device shown in FIG. 13.

Figure 14:
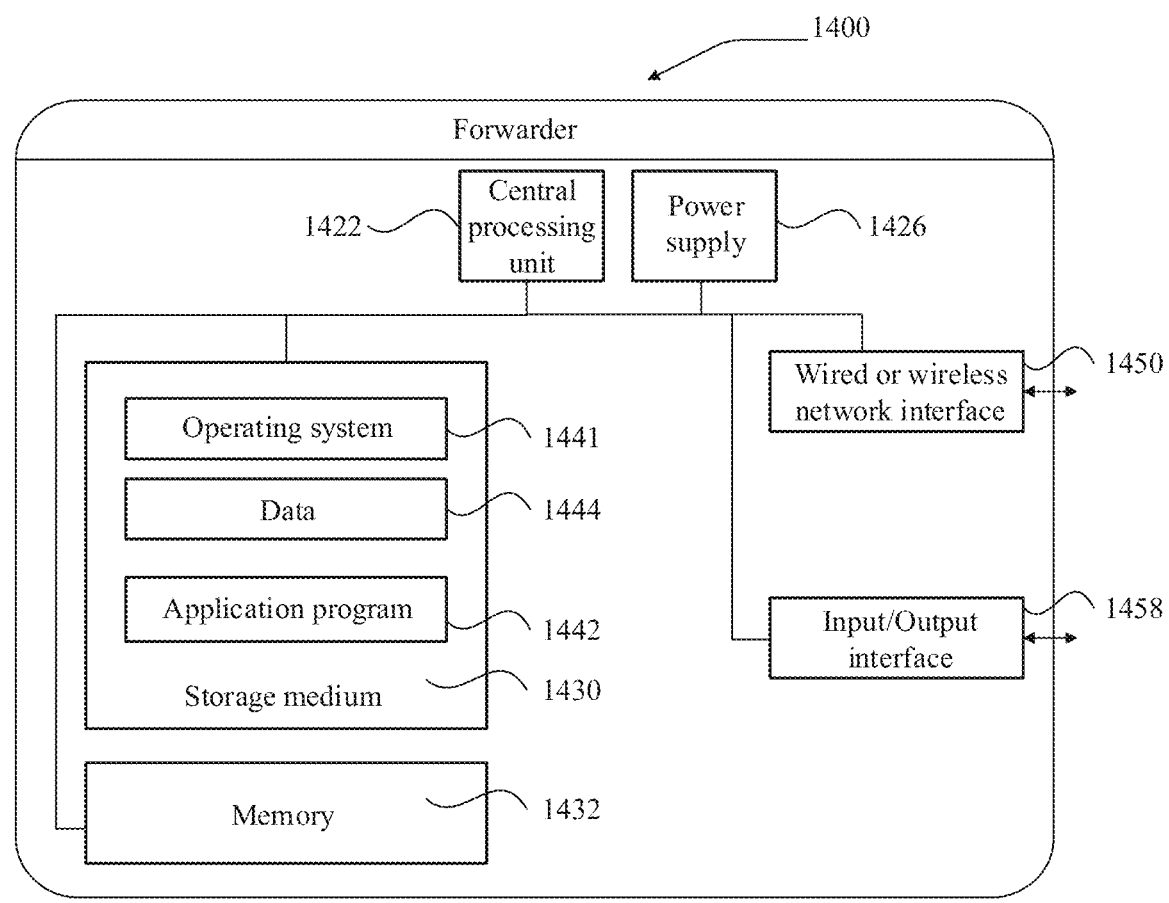
FIG. 14 is a schematic diagram of another embodiment of a forwarder according to an embodiment of this application.

FIG. 14 is a schematic diagram of another embodiment of a forwarder according to an embodiment of this application. The forwarder 1400 may vary greatly due to different configurations or performance, and may include one or more central processing units (CPU) 1422 (for example, one or more processors) and a memory 1432, one or more storage media 1430 (for example, one or more massive storage devices) that store an application program 1442 or data 1444. The memory 1432 and the storage medium 1430 may be used for temporary storage or permanent storage. The program stored in the storage medium 1430 may include one or more modules (not shown in the figure). Each module may include a series of instruction operations for the forwarder. Further, the central processing unit 1422 may be configured to communicate with the storage medium 1430, and perform, on the forwarder 1400, the series of instruction operations in the storage medium 1430.

The forwarder 1400 may further include one or more power supplies 1426, one or more wired or wireless network interfaces 1450, one or more input/output interfaces 1458, and/or one or more operating systems 1441, such as Windows Server™, Mac OS X™, Unix™, Linux™, and FreeBSD™.

Operations performed by the forwarder in FIG. 3 to FIG. 10 in the foregoing embodiments may be based on a structure of the forwarder shown in FIG. 14.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of FIG. 3 to FIG. 10 in this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A data processing method applied to a multi-head management scenario, wherein the multi-head management scenario is a scenario in which a forwarder is managed by a plurality of management devices, the method comprising:
   sending, by a first management device in the plurality of management devices, a lock instruction to the forwarder, wherein the lock instruction is used to instruct the forwarder to switch to a locked state, and the locked state is a state in which the forwarder is controlled only by the first management device;
   performing, by the first management device, difference comparison between target data and corresponding data to obtain a comparison result, wherein the target data is data on the first management device, and the corresponding data is data that is on the forwarder and that corresponds to the target data;
   obtaining, by the first management device, each feature of the target data and each corresponding feature of the corresponding data;
   comparing, by the first management device, each feature of the target data with each corresponding feature of the corresponding data to obtain the comparison result, wherein each feature of the target data and each feature of the corresponding data are each obtained in a tree structure model and compared based on the tree structure models; and
   synchronizing, by the first management device, the target data with the corresponding data if the first management device determines, by using the comparison result, that the target data and the corresponding data do not match, so that the target data matches the corresponding data.

2. The method according to claim 1, wherein the lock instruction comprises a lock indication and identity information of the first management device, the identity information is used by the forwarder to determine a lock source, and the lock indication is used to instruct the forwarder to switch to the locked state.

3. The method according to claim 1, wherein the synchronizing, by the first management device, the target data with the corresponding data comprises:
   determining, by the first management device based on the comparison result, to update the corresponding data by using the target data as a reference, or update the target data by using the corresponding data as a reference.

4. The method according to claim 1, wherein the synchronizing, by the first management device, the target data with the corresponding data further comprises:
   obtaining, by the first management device, input information, wherein the input information is obtained by the first management device in response to a user operation; and
   updating, by the first management device, the target data and the corresponding data based on the input information.

5. The method according to claim 4, wherein the first management device further comprises a display interface, and before the obtaining, by the first management device, input information, the method further comprises:
   displaying, by the first management device, the comparison result in the display interface.

6. The method according to claim 1, wherein the method further comprises:
   sending, by the first management device, an unlock instruction to the forwarder, wherein the unlock instruction is used at least by the forwarder to release the locked state, so that the forwarder can be managed by another management device other than the first management device.

7. A data processing method applied to a multi-head management scenario, wherein the multi-head management scenario is a scenario in which a forwarder is managed by a plurality of management devices, the method comprising:
   receiving, by the forwarder, a first lock instruction sent by a first management device in the plurality of management devices;
   switching, by the forwarder, to a first locked state based on the first lock instruction, wherein the first locked state is a state in which the forwarder can be controlled only by the first management device;
   receiving, by the forwarder, target data;
   comparing, by the forwarder, each feature of the target data with each corresponding feature of corresponding data on the forwarder to obtain a comparison result, wherein each feature of the target data and each feature of the corresponding data are in a tree structure model and compared based on the tree structure models; and
   synchronizing, by the forwarder, the target data with the corresponding data if the forwarder determines, by using the comparison result, that the target data and the corresponding data do not match, so that the target data matches the corresponding data.

8. The method according to claim 7, wherein the first lock instruction comprises a first lock indication and identity information of the first management device.

9. The method according to claim 8, wherein the switching, by the forwarder, to a first locked state based on the first lock instruction comprises:
   identifying, by the forwarder, a lock source based on the identity information; and
   switching, by the forwarder, to the first locked state based on the lock source and the first lock indication.

10. The method according to claim 9, wherein after the switching, by the forwarder, to the first locked state based on the lock source and the first lock instruction, the method further comprises:
    receiving, by the forwarder, configuration data; and
    storing, by the forwarder, the configuration data if identification information of a device that sends the configuration data matches the identity information of the first management device; or
    if identification information of a device that sends the configuration data and the identity information of the first management device do not match, discarding, by the forwarder, the configuration data, or responding to the management device that sends the configuration data with failure information.

11. The method according to claim 7, wherein the method further comprises:
    receiving, by the forwarder, an unlock instruction sent by the first management device; and releasing, by the forwarder, the first locked state based on the unlock instruction.

12. A management device, applied to a multi-head management scenario, wherein the multi-head management scenario is a scenario in which a forwarder is managed by a plurality of management devices, the management device comprising:
a processor; and
a memory, wherein
the memory is configured to store program code; and
the processor is configured to execute the program code to cause the management device to:
send a lock instruction to the forwarder, wherein the lock instruction is used to instruct the forwarder to switch to a first locked state, and the first locked state is a state in which the forwarder is controlled only by a first management device;
perform difference comparison between target data and corresponding data to obtain a comparison result, wherein the target data is data on the first management device, and the corresponding data is data that is on the forwarder and that corresponds to the target data;
obtaining each feature of the target data and each corresponding feature of the corresponding data;
comparing each feature of the target data with each corresponding feature of the corresponding data to obtain the comparison result, wherein each feature of the target data and each feature of the corresponding data are each obtained in a tree structure model and compared based on the tree structure models; and
synchronize the target data with the corresponding data if it is determined, by using the comparison result, that the target data and the corresponding data do not match, so that the target data matches the corresponding data.

13. The management device according to claim 12, wherein the processor is further configured to execute the program code to further cause the management device to:
determine, based on the comparison result, to update the corresponding data by using the target data as a reference, or update the target data by using the corresponding data as a reference.

14. The management device according to claim 12, wherein the processor is further configured to execute the program code to further cause the management device to:
obtain input information, wherein the input information is obtained by the management device in response to a user operation; and
update the target data and the corresponding data based on the input information.

15. The management device according to claim 12, wherein the processor is further configured to execute the program code to further cause the management device to:
after the synchronization unit synchronizes the target data with the corresponding data, update the corresponding data on the forwarder by using the target data if the target data is inconsistent with the corresponding data on the forwarder.

16. A forwarder, applied to a multi-head management scenario, wherein the multi-head management scenario is a scenario in which the forwarder is managed by a plurality of management devices, the forwarder comprising:
a processor; and
a memory, wherein
the memory is configured to store program code; and
the processor is configured to execute the program code to cause the forwarder to:
receive a first lock instruction sent by a first management device in the plurality of management devices;
switch to a first locked state based on the first lock instruction, wherein the first locked state is a state in which the forwarder can be controlled only by the first management device;
receive, by the forwarder, target data;
compare, by the forwarder, each feature of the target data with each corresponding feature of corresponding data on the forwarder to obtain a comparison result, wherein each feature of the target data and each feature of the corresponding data are in a tree structure model and compared based on the tree structure models; and
synchronizing, by the forwarder, the target data with the corresponding data if the forwarder determines, by using the comparison result, that the target data and the corresponding data do not match, so that the target data matches the corresponding data.

17. The forwarder according to claim 16, wherein the forwarder further comprises:
a second unlock unit, configured to release the first locked state when the forwarder determines that the first management device fails to respond within a preconfigured time or that data required by the forwarder is not within a management range of the first management device.

* * * * *